United States Patent
Park et al.

(10) Patent No.: US 10,334,093 B2
(45) Date of Patent: *Jun. 25, 2019

(54) APPARATUS AND METHOD FOR CONTROLLING BUILT-IN MICROPHONE OF PORTABLE TERMINAL

(71) Applicant: Samsung Electronics Co., Ltd., Gyeonggi-do (KR)

(72) Inventors: Sang-Kyu Park, Gyeonggi-do (KR); Seung-Yup Lee, Gyeonggi-do (KR); Jung-Ho Park, Seoul (KR); Soo-Ho Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,397

(22) Filed: Sep. 18, 2018

(65) Prior Publication Data

US 2019/0020752 A1    Jan. 17, 2019

Related U.S. Application Data

(63) Continuation of application No. 14/812,577, filed on Jul. 29, 2015, now Pat. No. 10,104,216, which is a
(Continued)

(30) Foreign Application Priority Data

May 4, 2007    (KR) .................. 10-2007-0043405

(51) Int. Cl.
*H04M 1/60* (2006.01)
*H04M 1/725* (2006.01)
*H04W 4/80* (2018.01)

(52) U.S. Cl.
CPC ....... *H04M 1/7253* (2013.01); *H04M 1/6016* (2013.01); *H04M 1/6058* (2013.01);
(Continued)

(58) Field of Classification Search
CPC ............. H04M 1/6016; H04M 1/6058; H04M 1/6066; H04M 1/725; H04M 1/7253; H04W 4/80
(Continued)

(56) References Cited

U.S. PATENT DOCUMENTS 4,790,002 A    12/1988  D'Agosto, III et al.
6,424,820 B1    7/2002  Burdick et al.
(Continued)

FOREIGN PATENT DOCUMENTS

CN    1492714    4/2004
EP    1 199 867    10/2000
(Continued)

OTHER PUBLICATIONS

Motorola Manual entitled "Motorola Rokr E2," exhibited in CES Trade Show, Jan. 2006.
(Continued)

*Primary Examiner* — Timothy X Pham
(74) *Attorney, Agent, or Firm* — The Farrell Law Firm, P.C.

(57) ABSTRACT

A mobile phone is provided that is configured to obtain information of one or more external wireless devices operatively coupled with the mobile phone. In response to a call connection event, when the mobile phone is operatively coupled with one external wireless device among the one or more external wireless devices, and if obtained information regarding the one external wireless device indicates that the one external wireless device does not include a microphone, an audio input is obtained via the built-in microphone. In response to a call connection event, when the mobile phone is operatively coupled with one external wireless device among the one or more external wireless devices, and if obtained information regarding the one external wireless
(Continued)

device indicates that the one external wireless device includes a microphone, an audio input is obtained via the microphone of the one external wireless device.

17 Claims, 2 Drawing Sheets

Related U.S. Application Data continuation of application No. 14/507,217, filed on Oct. 6, 2014, now Pat. No. 9,124,711, which is a continuation of application No. 14/325,848, filed on Jul. 8, 2014, now Pat. No. 9,124,710, which is a continuation of application No. 12/113,577, filed on May 1, 2008, now Pat. No. 8,774,863.

(52) U.S. Cl.
CPC ......... *H04M 1/6066* (2013.01); *H04M 1/725* (2013.01); *H04W 4/80* (2018.02)

(58) Field of Classification Search
USPC ....................................................... 455/41.2
See application file for complete search history.

(56) References Cited

U.S. PATENT DOCUMENTS

| | | | |
|---|---|---|---|
| 6,594,366 | B1 | 7/2003 | Adams |
| 7,904,113 | B2 | 3/2011 | Ozluturk et al. |
| 2001/0016506 | A1 | 8/2001 | Son et al. |
| 2002/0037746 | A1 | 3/2002 | Osano |
| 2003/0115059 | A1 | 6/2003 | Jayaratne |
| 2003/0151678 | A1 | 8/2003 | Lee et al. |
| 2004/0053573 | A1 | 3/2004 | Karusawa |
| 2004/0209647 | A1 | 10/2004 | Jeong et al. |
| 2004/0209658 | A1 | 10/2004 | Liu et al. |
| 2004/0266349 | A1 | 12/2004 | Wang |
| 2005/0090141 | A1 | 4/2005 | Peng et al. |
| 2005/0130593 | A1 | 6/2005 | Michalak |
| 2005/0146227 | A1 | 7/2005 | Jackson et al. |
| 2005/0215290 | A1 | 9/2005 | Wakabayashi et al. |
| 2005/0282592 | A1* | 12/2005 | Frerking ................ H04M 1/05 455/575.2 |
| 2006/0062400 | A1 | 3/2006 | Chia-Chun |
| 2006/0165243 | A1 | 7/2006 | Lee |
| 2006/0251277 | A1 | 11/2006 | Cho |
| 2007/0037615 | A1 | 2/2007 | Glezerman |
| 2007/0082717 | A1 | 4/2007 | Lee et al. |
| 2007/0230905 | A1 | 10/2007 | Kato et al. |
| 2007/0233905 | A1 | 10/2007 | Hatano et al. |
| 2008/0146292 | A1 | 6/2008 | Gilmore et al. |
| 2008/0159561 | A1 | 7/2008 | Parker et al. |
| 2008/0164994 | A1* | 7/2008 | Johnson ................ H01R 13/703 340/533 |
| 2008/0200159 | A1 | 8/2008 | Lai |
| 2008/0261524 | A1 | 10/2008 | Grushkevich |
| 2009/0124202 | A1* | 5/2009 | Seshadri ................ H04M 1/05 455/41.2 |

FOREIGN PATENT DOCUMENTS

| | | |
|---|---|---|
| EP | 1 482 715 | 1/2004 |
| EP | 1 401 179 | 3/2004 |
| EP | 1 670 283 | 6/2006 |
| EP | 1 684 492 | 7/2006 |
| EP | 1 760 897 | 7/2007 |
| JP | 2005109845 | * 3/2003 |
| JP | 2005-109845 | 4/2005 |
| JP | 2006279586 | 10/2006 |
| JP | 4121926 | 7/2008 |
| KR | 1020050109830 | 11/2005 |
| KR | 1020060088374 | 8/2006 |
| KR | 1020070017834 | 2/2007 |
| WO | WO 99/45685 | 9/1999 |
| WO | WO 2006/046357 | 5/2006 |

OTHER PUBLICATIONS

U.S. Office Action dated Dec. 3, 2014 issued on counterpart U.S. Appl. No. 14/507,217.
European Search Report dated May 19, 2015 issued in counterpart application No. 08155054.3-1972.
U.S. Office Action dated Nov. 28, 2014 issued in counterpart U.S. Appl. No. 14/325,848.
Chinese Office Action dated Sep. 22, 2015 issued on counterpart application No. 200810131455.1, 16 pages.
European Search Report dated Dec. 10, 2015 issued in counterpart application No. 08155054.3-1972, 4 pages.
Chinese Office Action dated Dec. 1, 2015 issued in counterpart application No. 200810131455.1, 28 pages.
First Action Interview Pre-Interview Communication dated Dec. 14, 2015 issued in counterpart U.S. Appl. No. 14/842,515, 7 pages.
European Search Report dated Mar. 9, 2016 issued in counterpart application No. 15188658.7-1972, 4 pages.
European Search Report dated Mar. 29, 2016 issued in counterpart application No. 15188658.7-1972, 5 pages.
Chinese Office Action dated Aug. 2, 2016 issued in counterpart application No. 201510623061.8, 15 pages.
European Search Report dated Mar. 3, 2017 issued in counterpart application No. 15188658.7-1972, 9 pages.
Chinese Office Action dated Mar. 1, 2017 issued in counterpart application No. 201510623061.8, 20 pages.
Chinese Office Action dated Aug. 1, 2017 issued in counterpart application No. 201510623061.8, 7 pages.
Chinese Office Action dated Dec. 4, 2017 issued on counterpart application No. 201610821556.6, 19 pages.
Chinese Office Action dated Dec. 19, 2017 issued in counterpart application No. 201510623061.8, 11 pages.
European Search Report dated Jan. 5, 2018 issued in counterpart application No. 17192586.0-1972, 9 pages.
Sony Ericsson Mobile Phone Z600, Internet version of the user's guide, Aug. 2003, 128 pages.
Chinese Office Action dated Jul. 3, 2018 issued in counterpart application No. 201610821556.6, 25 pages.
U.S. Office Action dated Jul. 26, 2016 issued in counterpart U.S. Appl. No. 14/812,577, 28 pages.
European Search Report dated Oct. 25, 2018 issued in counterpart application No. 17192586.0-1216, 6 pages.
European Search Report dated Feb. 19, 2019 issued in counterpart application No. 18187868.7-1216, 11 pages.
Chinese Rejection Decision dated Jan. 23, 2019 issued in counterpart application No. 201610821556.6, 14 pages.

* cited by examiner

APPARATUS AND METHOD FOR CONTROLLING BUILT-IN MICROPHONE OF PORTABLE TERMINAL

PRIORITY

This application is a Continuation Application of U.S. application Ser. No. 14/812,577, which was filed in the U.S. Patent & Trademark Office (USPTO) on Jul. 29, 2015, which is a Continuation Application of U.S. application Ser. No. 14/507,217, which was filed in the USPTO on Oct. 6, 2014, now U.S. Pat. No. 9,124,711, issued on Sep. 1, 2015, which was a Continuation Application of U.S. application Ser. No. 14/325,848, which was filed in the USPTO on Jul. 8, 2014, now U.S. Pat. No. 9,124,710 issued on Sep. 1, 2015, which was a Continuation Application of U.S. application Ser. No. 12/113,577, which was filed in the USPTO on May 1, 2008, now U.S. Pat. No. 8,774,863 issued on Jul. 8, 2014, which claims priority under 35 U.S.C. § 119(a) to a Korean patent application filed in the Korean Intellectual Property Office on May 4, 2007 and assigned Serial No. 2007-43405, the entire contents of each of which are incorporated herein by reference.

BACKGROUND OF THE INVENTION

1. Field of the Invention

The present invention relates to an apparatus and method for controlling a built-in microphone of a portable terminal. More particularly, the present invention relates to an apparatus and method in which a built-in microphone of a portable terminal is controlled such that, when a call connection event occurs for call reception/origination in the portable terminal connected with an earphone without a microphone, an output audio signal is output to the connected earphone and an input audio signal is received through the built-in microphone.

2. Description of the Related Art

Recently, with the rapid development of portable terminals, a mobile phone providing wireless voice call and data exchange is regarded as a necessity of life. Conventional portable terminals have generally been regarded as portable devices providing wireless calls. However, along with technical advances and introduction of the wireless Internet, portable terminals are now used for many purposes in addition to telephone calls or schedule management. For example, images can be captured by using a digital camera included in a portable terminal. Further, the portable terminal provides a variety of functions such as watching a satellite broadcasting program, games, Web surfing using the wireless Internet, watching video, listening to music, e-mail services, and so on.

In particular, a headset may be used to receive services in a public place by using a portable terminal capable of playing back video and music. When launched, the portable terminal generally includes a headset so that a user can receive music and audio services through a speaker included in the headset. In addition, when a call is made by call connection, a call service can be provided by receiving user's voice through a microphone included in the headset.

However, as high-quality sound can be provided with the continued development of the portable terminal, users are generally no longer satisfied with the quality of sound provided through the headset included in the portable terminal. Thus, such a user must additionally purchase a device for outputting high-quality sound according to personal preference.

In general, the output device purchased by the user is an earphone without a microphone. In this case, when a call connection event occurs for call reception/origination in a state that the earphone without the microphone is connected to the conventional portable terminal, in order to make a call, the earphone connected to the portable terminal has to be disconnected. In addition, the user inconveniently has to take off the earphone from his or her ear. That is, to achieve the high-quality sound, the user has to experience inconvenience during a call connection.

SUMMARY OF THE INVENTION

An aspect of the present invention is to address at least the above-mentioned problems and/or disadvantages and to provide at least the advantages described below. Accordingly, an aspect of the present invention is to provide an apparatus and method for controlling a built-in microphone of a portable terminal.

Another aspect of the present invention is to provide an apparatus and method for controlling a built-in microphone of a portable terminal, in which a connection device is checked upon detecting a call connection event and whether to use the built-in microphone is determined according to the connection device.

Another aspect of the present invention is to provide an apparatus and method in which a built-in microphone of a portable terminal is controlled such that, when a call connection event occurs for call reception/origination in the portable terminal connected with an earphone without a microphone, an output audio voice signal is output to the connected earphone and an input audio signal is received through the built-in microphone.

According to an aspect of the present invention, a mobile phone is provided that includes a built-in microphone, a wireless communication unit, and a controller. The controller is configured to obtain information of one or more external wireless devices operatively coupled with the mobile phone via the wireless communication unit. In response to a call connection event, when the mobile phone is operatively coupled with one external wireless device among the one or more external wireless devices, and if obtained information regarding the one external wireless device indicates that the one external wireless device does not include a microphone, an audio input is obtained via the built-in microphone. In response to a call connection event, when the mobile phone is operatively coupled with one external wireless device among the one or more external wireless devices, and if obtained information regarding the one external wireless device indicates that the one external wireless device includes a microphone, an audio input is obtained via the microphone of the one external wireless device. In response to a call connection event, when the mobile phone is operatively coupled with two wireless external devices, and if obtained information regarding the two external wireless device indicates that both the two external wireless devices include a microphone, an audio input is selectively obtained via the microphone of one of the two wireless external devices. In response to a call connection event, when the mobile phone is operatively coupled with two wireless external devices, and if obtained information regarding the two external wireless device indicates that both the two external wireless devices do not include a microphone, an audio input is obtained via the built-in microphone.

According to another aspect of the present invention, a non-transitory computer readable memory storing one or more programs is provided, which when executed by a controller of a mobile phone, performs the step of obtaining information of one or more external wireless devices operatively coupled with the mobile phone via the wireless communication unit. In response to a call connection event, when the mobile phone is operatively coupled with one external wireless device among the one or more external wireless devices, and if obtained information regarding the one external wireless device indicates that the one external wireless device does not include a microphone, an audio input is obtained via the built-in microphone. In response to a call connection event, when the mobile phone is operatively coupled with one external wireless device among the one or more external wireless devices, and if obtained information regarding the one external wireless device indicates that the one external wireless device includes a microphone, an audio input is obtained via the microphone of the one external wireless device. In response to a call connection event, when the mobile phone is operatively coupled with two wireless external devices, and if obtained information regarding the two external wireless device indicates that both the two external wireless devices include a microphone, an audio input is selectively obtained via the microphone of one of the two wireless external devices. In response to a call connection event, when the mobile phone is operatively coupled with two wireless external devices, and if obtained information regarding the two external wireless device indicates that both the two external wireless devices do not include a microphone, an audio input is obtained via the built-in microphone.

According to another aspect of the present invention, a mobile phone is provided that is capable of coupling to a wireless external device and a wired external device. The mobile phone includes a wireless communication unit configured to wirelessly couple with a plurality of wireless external devices, a socket configured to couple with a wired external device including a speaker, or a speaker and a microphone, and a controller. The controller is configured to obtain first information from the wireless communication unit wirelessly coupled with the plurality of wireless external devices and second information from the socket coupled with the wired external device. The controller is also configured to, in response to receiving a call connection event while the mobile phone is operatively coupled with the plurality of wireless external device and the wired external device: when only one device among the plurality of wireless external devices and the wired external device includes a microphone according to the first information and the second information, obtain an audio input from the one device of the plurality of wireless external devices and the wired external device that includes a microphone, and when the plurality of wireless external devices and the wired external device includes a microphone according to the first information and the second information, selectively obtain an audio input from one of the microphones of the plurality of wireless external devices and the microphone of the wired external device.

BRIEF DESCRIPTION OF THE DRAWINGS

The above and other aspects, features and advantages of certain embodiments of the present invention will become more apparent from the following detailed description when taken in conjunction with the accompanying drawings in which.

DETAILED DESCRIPTION OF EMBODIMENTS OF THE PRESENT INVENTION

Embodiments of the present invention will be described below with reference to the accompanying drawings. In the following description, well-known functions or constructions are not described in detail since they would obscure the invention in unnecessary detail.

The present invention relates to an apparatus and method in which a built-in microphone of a portable terminal is controlled such that, when a call connection event occurs for call reception/origination in the portable terminal connected with an earphone without a microphone, an output audio signal is output to the connected earphone and an input audio signal is received through the built-in microphone. The present invention will hereinafter be described with reference to FIG. 1.

In the present invention, an earphone is defined as a device that does not include a microphone and includes a speaker for outputting an output audio signal. A wireless earphone is defined as a device that does not include a microphone and includes a speaker for outputting an output audio signal by being wirelessly connected through a wireless connection method such as Bluetooth®. A headset is defined as a device that includes both a microphone and a speaker. A wireless headset is defined as a device that includes both a microphone and a speaker, each of which transmits/receives an audio signal by being wireless connecting through a wireless connection method such as the Bluetooth. The headset or the wireless headset is also referred to as an ear microphone.

Figure 1:
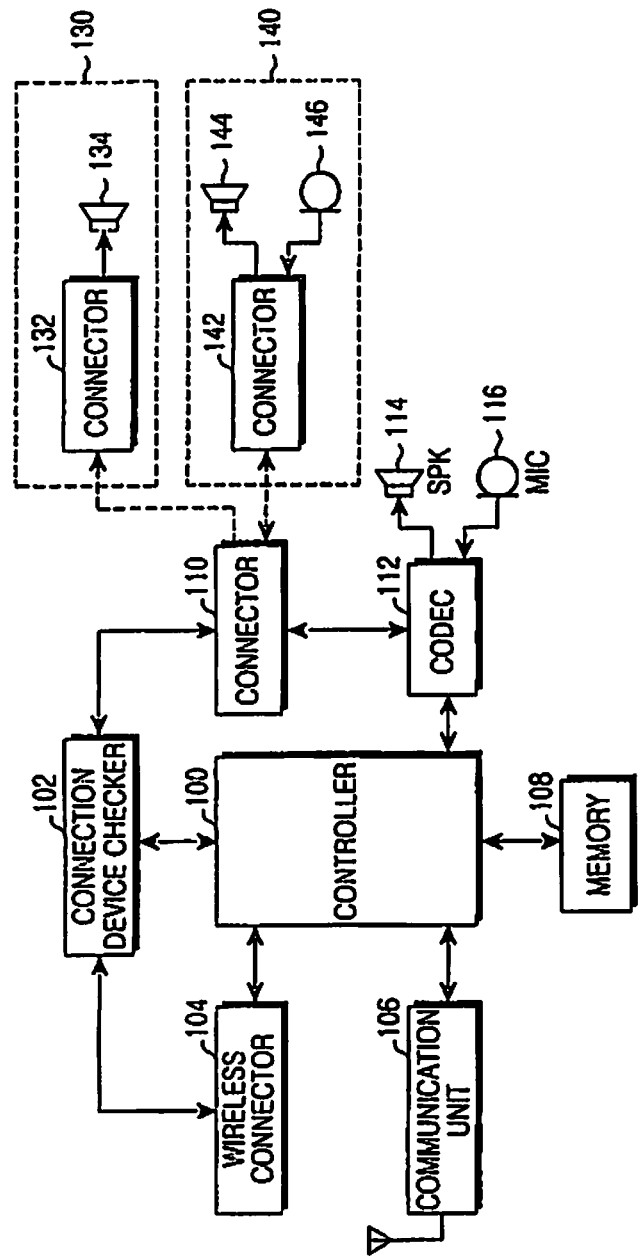
FIG. 1 is a block diagram illustrating a structure of a portable terminal for detecting whether to use a built-in microphone depending on which connection device is used when a call connection event occurs, according to an embodiment of the present invention.

Referring to FIG. 1, the portable terminal of the present invention includes a controller 100, a connection device checker 102, a wireless connector 104, a communication unit 106, a memory 108, a connector 110, a COder-DECoder (CODEC) 112, a built-in speaker 114, and a built-in microphone 116.

The wireless connector 104 wirelessly transmits/receives an audio signal by connecting a wireless device (e.g., wireless earphone or wireless headset) under the control of the controller 100, and provides information on the connected wireless device to the connection device checker 102 at the request of the connection device checker 102. The wireless connector 104 may use a Bluetooth communication technique for wireless connection. When the wireless connector 104 uses the Bluetooth communication technique, a general operation of Bluetooth communication is performed in which a connectable Bluetooth device is searched for under the control of the controller 100 and Bluetooth connection is made by pairing if authentication is required. In the present invention, the wireless connector 104 is optional, and thus may not be provided.

In a receiving operation, the communication unit 106 decreases a frequency of a Radio Frequency (RF) signal received through an antenna, and then performs de-spreading and channel decoding on the received signal. In a transmitting operation, the communication unit 106 performs channel coding and spreading on the received signal, increases the frequency of the received signal, and then transmits the signal through the antenna. In addition, in order to connect a call, the communication unit 106 receives or transmits a call connection request.

The memory 108 stores programs for controlling an overall operation of the portable terminal, application programs, and data (e.g., telephone numbers, Short Message Service (SMS) messages, compressed image files, video, etc.).

Through a wired connection, the connector 110 may be physically connected to a connector 132 of an earphone 130 including only a speaker 134 or may be physically connected to a connector 142 of a headset 140 including both a speaker 144 and a microphone 146. The connector 110 may be composed of one socket that can connect both the earphone 130 and the headset 140. Alternatively, the connector 110 may be composed of a first socket for connecting the earphone 130 and a second socket for connecting the headset 140 so as to be respectively connected to a plurality of devices.

The CODEC 112 connected to the controller 100, the built-in speaker 114 connected to the CODEC 112, and the built-in microphone 116 are provided as an audio input/output block used for a voice call. The CODEC 112 converts Pulse Code Modulation (PCM) data provided from the controller 100 into an analog audio signal and then transmits the analog audio signal to the built-in speaker 114, or transmits the analog audio signal through the earphone 130 and the speaker 144 of the headset 140. In addition, the CODEC 112 converts an input audio signal received through the built-in microphone 116 or through the microphone 146 of the headset 140 into data, and then transmits the data to the controller 100.

At the request of the controller 100, the connection device checker 102 checks the wireless connector 104 so as to determine whether a wireless earphone or a wireless headset is connected. In addition, the connection device checker 102 checks the connector 110 so as to determine whether an earphone or a headset is connected. Then, the connection device checker 102 provides the controller 100 with information on the connected device.

Upon detecting a call connection event when a call connection request is received or transmitted, the controller 100 requests the connection device checker 102 to send information on a connection device currently connected, and receives information on the connection device from the connection device checker 102 and thus selects a device for inputting/outputting an audio signal according to the connection device.

In other words, under the control of the controller 100, upon detecting the call connection event, information on the connection device currently connected is checked through the connection device checker 102, and if the connection device is either an earphone or a wireless earphone, an output audio signal is output to the connected earphone or the wireless earphone, and the input audio signal is received by activating the built-in microphone 116 of the portable terminal. If the information on the connection device is a headset (or wireless headset), audio signal is input/output by activating a speaker and a microphone of the headset (or wireless headset). If no connection device is connected, the audio signal is input/output by activating the built-in speaker 114 and the built-in microphone 116 of the portable terminal. In addition, under the control of the controller 100, when the call connection event occurs, if the connection device information obtained by the connection device checker 102 shows that two or more connection devices are connected, the connection devices for providing services are selected according to a predetermined priority. For example, if the connector 110 has a plurality of connection sockets and detects the call connection event in a state that both an earphone and a headset are connected, then the audio signal is input/output by activating the speaker and microphone of the headset under the control of the controller 100.

Meanwhile, the controller 100 controls the connection device checker 102. That is, the controller 100 may perform a function of the connection device checker 102. The controller 100 and the connection device checker 102 are described as being separately implemented in the present invention for explanation purposes only. Thus, in practice, the connection device checker 102 may be incorporated into the controller 100 or may be provided separately from the controller 100.

Figure 2:
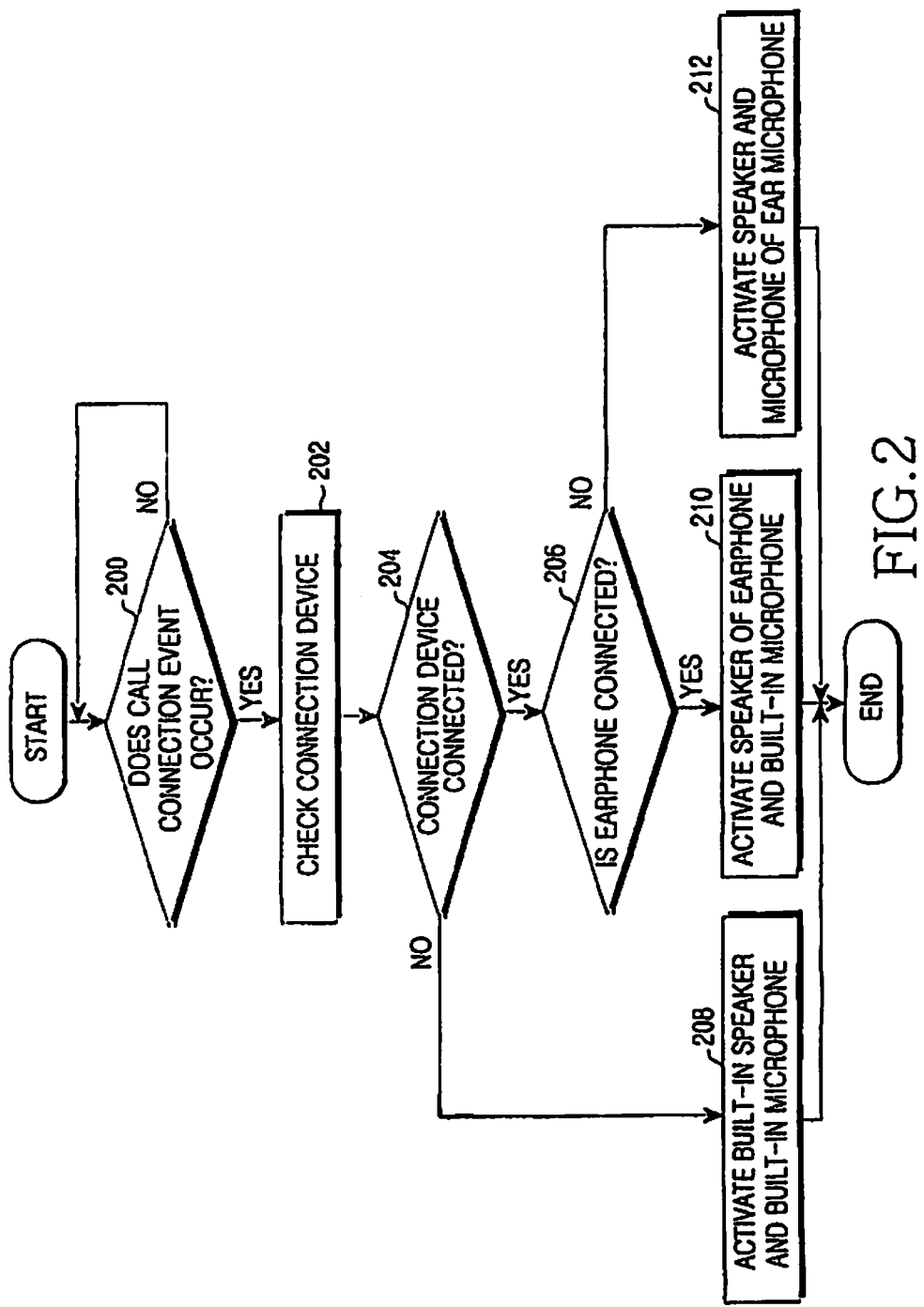
FIG. 2 is a flowchart illustrating a process of determining whether to use a built-in microphone depending on which connection device is used when a call connection event occurs in a portable terminal, according to an embodiment of the present invention.

Now, a method of controlling a microphone of a portable terminal according to the present invention will be described with reference to FIG. 2. FIG. 2 is a flowchart illustrating a process of determining whether to use a built-in microphone depending on which connection device is used when a call connection event occurs in a portable terminal, according to an embodiment of the present invention.

Referring to FIG. 2, upon detecting a call connection event in step 200, information on a connected connection device is checked in step 202.

In step 204, existence of the connection device is determined according to the checking result of step 202. If the determination result of step 204 shows that no connection device is connected, a built-in speaker and a built-in earphone are activated in step 208, so as to input/output an audio signal.

If the determination result of step 204 shows that a connection device is connected, it is determined whether the connected connection device is an earphone in step 206. If the determination result of step 206 shows that the connected connection device is the earphone, a speaker of the earphone and a built-in microphone of the portable terminal are activated in step 210, so that the output audio signal is output through the speaker of the earphone and the input audio signal is received through the built-in microphone.

If the determination result of step 206 shows that the connected connection device is not the earphone but a headset, the speaker and microphone of the headset are activated so that the audio signal is input/output through the ear microphone.

Although it has been described in FIG. 2 that the earphone and the headset are connected, the earphone described in FIG. 2 may be a wireless earphone, and the headset may be a wireless headset.

According to the present invention, an apparatus and method is provided in which a microphone of a portable terminal is controlled such that, when a call connection event occurs for call reception/origination in the portable terminal connected with an earphone without a microphone, an output audio signal is output to the connected earphone and an input audio signal is received through a built-in microphone of the portable terminal. Therefore, a call can be made without having to disconnect the earphone from the portable terminal, thereby providing convenience to users.

While the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An electronic device comprising:
   a built-in microphone;
   a wireless communication unit configured to operatively and wirelessly connect with a plurality of wireless external devices, wherein each of the plurality of wireless external devices includes a speaker, with or without a microphone; and
   a controller configured to:
      obtain information regarding the plurality of wireless external devices from the wireless communication unit operatively and wirelessly connected with the plurality of wireless external devices, and
      in response to receiving a call connection event while the wireless communication unit is operatively and wirelessly connected with the plurality of wireless external devices:
         when the obtained information indicates that only one of the plurality of wireless external devices includes a microphone, obtain an audio input from the one of the plurality of wireless external devices that includes the microphone,
         when the obtained information indicates that at least two of the plurality of wireless external devices each include a respective microphone, selectively obtain an audio input from a microphone of one of the at least two of the plurality of wireless external devices, and
         when the obtained information indicates that none of the plurality of wireless external devices includes a microphone, obtain an audio input from the built-in microphone of the electronic device.

2. The electronic device of claim 1, wherein, in response to receiving the call connection event while the wireless communication unit is operatively and wirelessly connected with the plurality of wireless external devices, the controller is further configured to:
   when the obtained information indicates that at least two of the plurality of wireless external devices each include a respective speaker, selectively provide an audio output of an incoming call through one of the speakers of the at least two of the plurality of wireless external devices.

3. The electronic device of claim 1, wherein, in response to receiving a connection event while the electronic device is not operatively and wirelessly connected with any of the plurality of wireless external devices, the controller is further configured to: obtain an audio input from the built-in microphone of the electronic device.

4. The electronic device of claim 1, wherein the audio input is selectively obtained from one of the microphones of the at least two of the plurality of wireless external devices based on corresponding priorities of the at least two of the plurality of wireless external devices.

5. The electronic device of claim 1, wherein the information is used to determine an existence of microphones in the plurality of wireless external devices.

6. The electronic device of claim 1, wherein the wireless communication unit is operatively and wirelessly connected with two wireless external devices.

7. The electronic device of claim 6, wherein, in response to receiving the call connection event while the wireless communication unit is operatively and wirelessly connected with the two wireless external devices, the controller is further configured to:
   when the obtained information indicates that the two wireless external devices each does not include a respective microphone, obtain an audio input from the built-in microphone of the electronic device.

8. A non-transitory computer readable memory storing one or more programs, which when executed by a controller of an electronic device, performs the steps of:
   obtaining information regarding a plurality of wireless external devices from a wireless communication unit of the electronic device operatively and wirelessly connected with the plurality of wireless external devices, wherein each of the plurality of wireless external devices includes a speaker, with or without a microphone; and
   in response to receiving a call connection event while the wireless communication unit is operatively and wirelessly connected with the plurality of wireless external devices:
      when the obtained information indicates that only one of the plurality of wireless external devices includes a microphone, obtaining an audio input from the one of the plurality of wireless external devices,
      when the obtained information indicates that at least two of the plurality of wireless external devices each include a respective microphone, selectively obtaining an audio input from a microphone of one of the at least two of the plurality of wireless external devices, and
      when the obtained information indicates that none of the plurality of wireless external devices includes a microphone, obtaining an audio input from a built-in microphone of the electronic device.

9. The non-transitory computer readable memory of claim 8, wherein the one or more programs further comprise the step of:
   in response to receiving the call connection event while the wireless communication unit is operatively and wirelessly connected with the plurality of external devices, when the obtained information indicates that at least two of the plurality of wireless external devices each include a respective speaker, selectively providing an audio output of an incoming call through one of the speakers of the at least two of the plurality of wireless external devices.

10. The non-transitory computer readable memory of claim 8, wherein the one or more programs further comprise the step of:
    in response to receiving a call connection event while the wireless communication unit is operatively and wirelessly connected with the plurality of wireless external devices, when the obtained information indicates that the only one of the plurality of wireless external devices includes a speaker, providing an audio output of an incoming call through the speaker of the one of the plurality of wireless external devices.

11. The non-transitory computer readable memory of claim 8, wherein the one or more programs further comprise the step of:

when the electronic device is not operatively and wirelessly connected with any of the plurality of wireless external devices, providing audio output using a built-in speaker of the electronic device.

12. The non-transitory computer readable memory of claim 8, wherein the audio input is selectively obtained from one of the microphones of the at least two of the plurality of wireless external devices based on corresponding priorities of the at least two of the plurality of wireless external devices.

13. The non-transitory computer readable memory of claim 8, wherein the information is used to determine an existence of microphones in the plurality of wireless external devices.

14. An electronic device capable of connecting to a wireless external device and a wired external device, the electronic device comprising:
   a built-in microphone;
   a wireless communication unit configured to operatively and wirelessly connect with a plurality of wireless external devices, wherein each of the plurality of wireless external devices includes a speaker, with or without microphone;
   a socket configured to connect with a wired external device including a speaker, or including a speaker and a microphone; and
   a controller configured to:
   obtain first information regarding the plurality of wireless external devices from the wireless communication unit operatively and wirelessly connect with the plurality of wireless external devices and second information regarding the wired external device from the socket connected with the wired external device, and
   in response to receiving a call connection event while the wireless communication unit is operatively and wirelessly connected with the plurality of wireless external devices and the socket is connected with the wired external device:
   when the obtained first information and the obtained second information indicate that only one device, among the plurality of wireless external devices and the wired external device, includes a microphone, obtain an audio input from the one device of the plurality of wireless external devices and the wired external device that includes the microphone,
   when the obtained first information and the obtained second information indicate that at least two of devices, among the plurality of wireless external devices and the wired external device, each include a respective microphone, selectively obtain an audio input from a microphone of one of the at least two devices, and
   when the obtained first information indicates that none of the plurality of wireless external devices includes a microphone and the obtained second information indicates that the wired external device does not include a microphone, obtain an audio input from the built-in microphone of the electronic device.

15. The electronic device of claim 14, wherein, in response to receiving the call connection event, the controller is further configured to:
   while the wireless communication unit is operatively and wirelessly connected with the plurality of wireless external devices when the obtained information indicates that at least two of the plurality of wireless external devices each include a respective speaker, selectively provide an audio output of an incoming call through a speaker of a device, among the plurality of wireless external devices and the wired external device.

16. The electronic device of claim 14, wherein, in response to receiving a connection event while the electronic device is not operatively and wirelessly connected with any of the plurality of wireless external devices and is not connected with the wired external device, the controller is further configured to:
   provide audio output using a built-in speaker of the electronic device.

17. The electronic device of claim 14, wherein the first information is used to determine an existence of microphones in the plurality of wireless external devices, and the second information is used to determine an existence of a microphone in the wired external device.

\* \* \* \* \*